US009391900B2

(12) United States Patent
Hapsari et al.

(10) Patent No.: US 9,391,900 B2
(45) Date of Patent: Jul. 12, 2016

(54) MOBILE STATION

(75) Inventors: Wuri Andarmawanti Hapsari, Tokyo (JP); Masashi Kanauchi, Tokyo (JP); Mikio Iwamura, Tokyo (JP); Itsuma Tanaka, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 53 days.

(21) Appl. No.: 14/003,961

(22) PCT Filed: Feb. 21, 2012

(86) PCT No.: PCT/JP2012/054135
§ 371 (c)(1),
(2), (4) Date: Nov. 14, 2013

(87) PCT Pub. No.: WO2012/121004
PCT Pub. Date: Sep. 13, 2012

(65) Prior Publication Data
US 2014/0056135 A1  Feb. 27, 2014

(30) Foreign Application Priority Data

Mar. 9, 2011 (JP) ................ P2011-052015

(51) Int. Cl.
*H04L 12/801* (2013.01)
*H04W 48/08* (2009.01)
*H04W 28/02* (2009.01)
*H04W 4/00* (2009.01)
*H04L 29/08* (2006.01)

(52) U.S. Cl.
CPC .......... *H04L 47/12* (2013.01); *H04W 28/0289* (2013.01); *H04W 48/08* (2013.01); *H04L 67/12* (2013.01); *H04W 4/005* (2013.01)

(58) Field of Classification Search
None
See application file for complete search history.

(56) References Cited

U.S. PATENT DOCUMENTS

| 6,751,472 | B1 | 6/2004 | Muhonen |
| 2008/0056286 | A1 | 3/2008 | Forssell et al. |
| 2008/0084272 | A1* | 4/2008 | Modiano ............ G07B 15/063 340/5.2 |
| 2010/0331034 | A1 | 12/2010 | Ishii et al. |
| 2012/0039171 | A1* | 2/2012 | Yamada et al. ............ 370/232 |
| 2012/0171993 | A1* | 7/2012 | Tiwari ............ H04W 48/02 455/410 |
| 2013/0044594 | A1* | 2/2013 | Kim et al. .............. 370/229 |
| 2013/0128777 | A1* | 5/2013 | Garcia Azorero .......... 370/259 |

FOREIGN PATENT DOCUMENTS

| EP | 2 192 749 A1 | 6/2010 |
| JP | 2009-253397 A | 10/2009 |
| JP | 2010-503251 A | 1/2010 |
| WO | 2008/029213 A2 | 3/2008 |
| WO | 2009/034930 A1 | 3/2009 |

OTHER PUBLICATIONS

International Search Report issued in PCT/JP2012/054135 mailed on Apr. 17, 2012 (4 pages).

(Continued)

*Primary Examiner* — Benjamin H Elliott, IV
(74) *Attorney, Agent, or Firm* — Osha Liang LLP

(57) ABSTRACT

A mobile station UE according to the present invention includes a control unit 13 that is configured not to transmit "RRC Connection Request" to a predetermined network when recognizing that the predetermined network is incompatible with an MTC function based on signaling from the predetermined network.

2 Claims, 3 Drawing Sheets

(56) References Cited

OTHER PUBLICATIONS

Japanese Office Action for corresponding Japanese Application No. 2011-052015 mailed Apr. 23, 2013 (5 pages).

3GPP TS 24.301 V11.1.0; "3rd Generation Partnership Project; Technical Specification Group Core Network and Terminals; Non-Access-Stratum (NAS); protocol for Evolved Packet System (EPS); Stage3 (Release 11)"; Dec. 2011 (326 pages).

3GPP TS 23.122 V11.1.0; "3rd Generation Partnership Project; Technical Specification Group Core Network and Terminals; Non-Access-Stratum (NAS) functions related to Mobile Station (MS) in idle mode (Release 11)"; Dec. 2011 (44 pages).

3GPP TS 36.304 V10.4.0; "3rd Generation Partnership Project; Technical Specification Group Radio Access Network; Evolved Universal Terrestrial Radio Access (E-UTRA); User Equipment (UE) procedures in idle mode (Release 10)"; Dec. 2011 (33 pages).

Extended European Search Report issued in the counterpart European Patent Application No. 12755617.3, mailed Sep. 15, 2015 (9 pages).

3GPP TR 23.888 V1.0.0; "3rd Generation Partnership Project; Technical Specification Group Services and System Aspects; System Improvements for Machine-Type Communications (Release 10)"; Jul. 2010 (80 pages).

Samsung; "Evaluation for Overload/Congestion Control Solutions"; 3GPP TSG SA WG2 Meeting #79E, TD S2-103213; Elbonia; Jul. 6-13, 2010 (4 pages).

* cited by examiner

MOBILE STATION

TECHNICAL FIELD

The present invention relates to a mobile station.

BACKGROUND ART

Specifications of an MTC (Machine Type Communication) function are currently drawn up in an LTE (Long Term Evolution)-Release 10 system of 3GPP.

In the future, it is considered that a mobile station UE (MTC terminal) including the MTC function is installed in many devices (for example, a gas detection device, a device in a hospital, a bridge security device, and a device in a taxi).

It is considered that a communication frequency of the MTC terminal is less than a communication frequency of the normal mobile station UE. However, possibly networks are congested due to a connection request signal ("RRC Connection Request") from the MTC terminal and the like. Therefore, in 3GPP, it is defined that a priority given to a call from the MTC terminal may be set lower than a priority given to a call from the normal mobile station UE.

CITATION LIST

Non-Patent Literature

Non-Patent Literature 1: 3GPP TS24.301
Non-Patent Literature 2: 3GPP TS23.122
Non-Patent Literature 3: 3GPP TS36.304

At this point, in the existing LTE-Release 10 system, the MTC terminal is configured to transmit "RRC Connection Request" including information element "Delay Tolerant Indication" indicating that the MTC terminal is compatible with the MTC function, namely, permission of a communication delay.

However, a network that does not support the MTC function, for example, an LTE-Release 10 system network or an LTE-Release 8/9 system network, which does not support the MTC function, cannot interpret the information element "Delay Tolerant Indication".

Operation is not defined in 3GPP when the network receives "RRC Connection Request" including the information element "Delay Tolerant Indication".

SUMMARY OF THE INVENTION

The present invention has been devised to solve the problems described above, and an object thereof is to provide a mobile station that can prevent the transmission of the connection request signal to the network that does not support the MTC function when the mobile station operates as the MTC terminal.

In accordance with a first feature of the present invention, a mobile station includes a control unit that is configured not to transmit a connection request signal to a predetermined network when recognizing that the predetermined network is incompatible with a predetermined function based on signaling from the predetermined network.

As described above, the present invention can provide the mobile station that can prevent the transmission of the connection request signal to the network that does not support the MTC function when the mobile station operates as the MTC terminal.

DESCRIPTION OF EMBODIMENT

Figure 2:
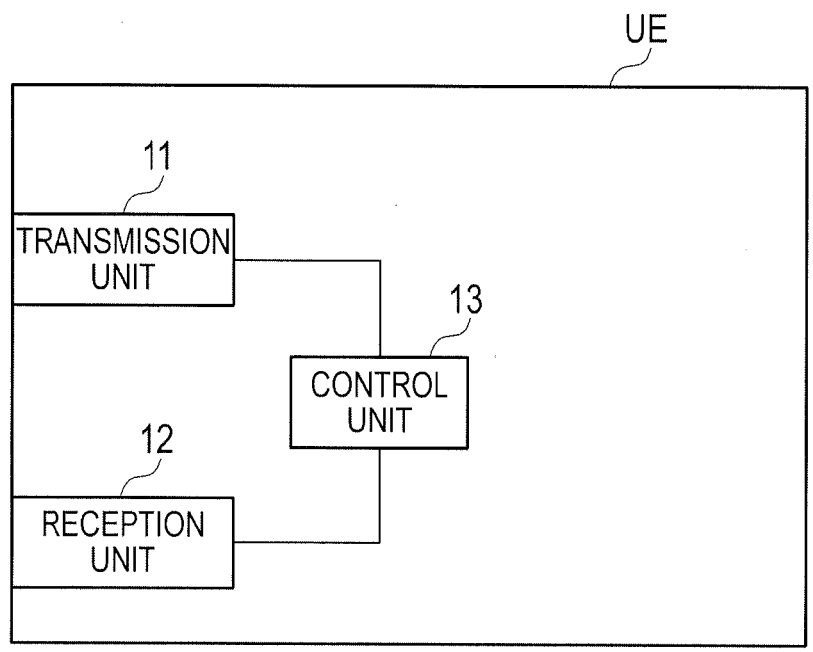
FIG. 2 is a functional block diagram of a mobile station according to the first embodiment of the present invention.
Figure 3:
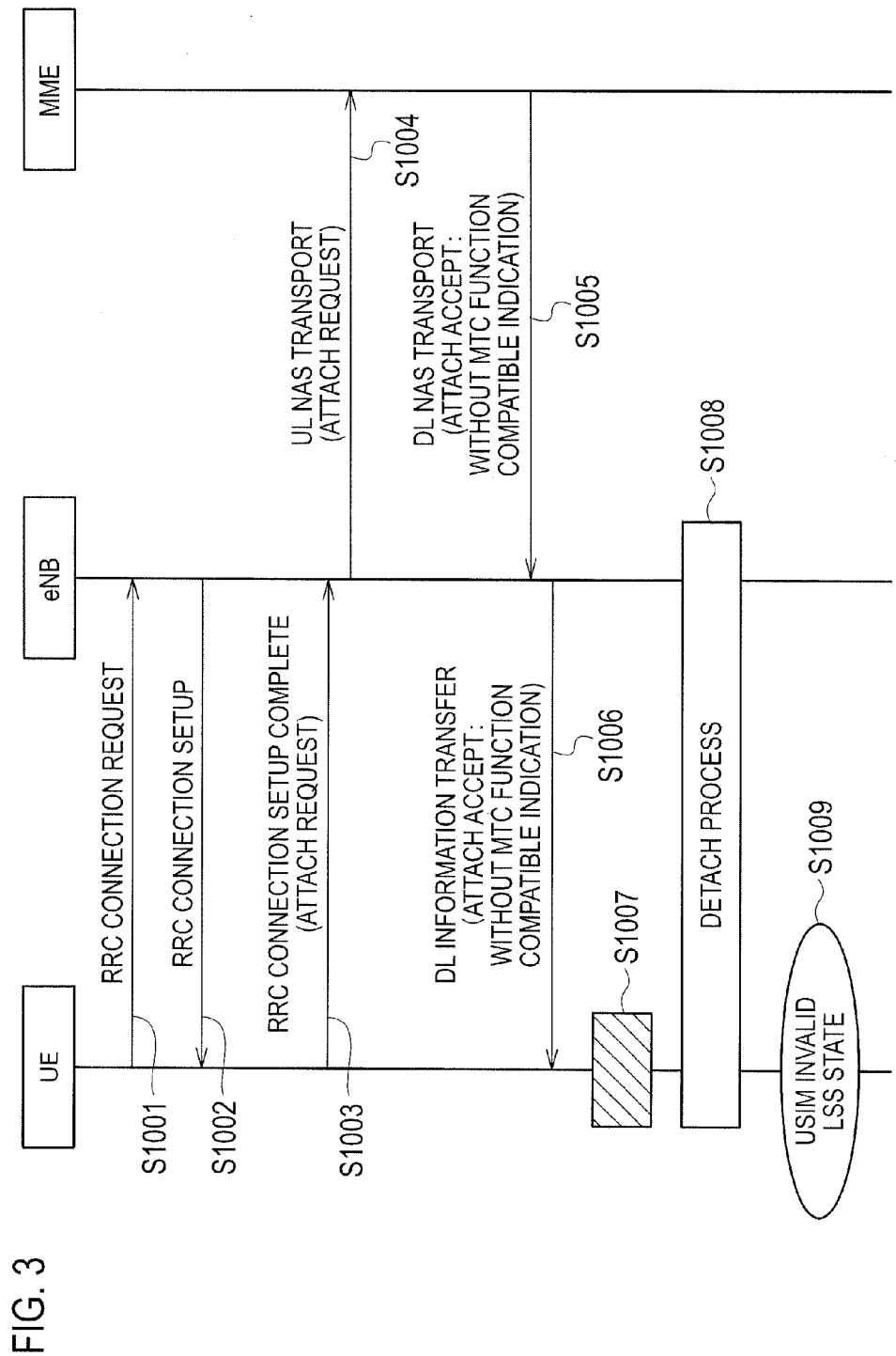
FIG. 3 is a sequence diagram illustrating operation of the mobile communication system according to the first embodiment of the present invention.

Mobile Communication System According to First Embodiment of the Present Invention A mobile communication system according to a first embodiment of the present invention will be described with reference to FIGS. 1 to 3.

Figure 1:
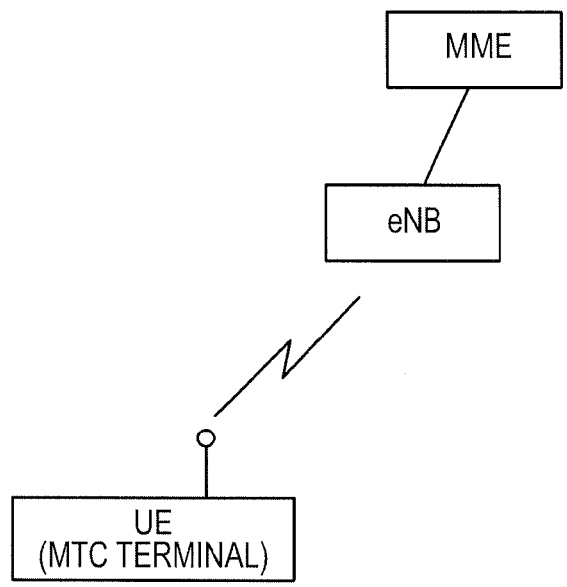
FIG. 1 is an entire configuration diagram of a mobile communication system according to a first embodiment of the present invention.

As illustrated in FIG. 1, the mobile communication system of the embodiment includes a mobile management node MME (Mobility Management Entity) and a radio base station eNB that is connected under a domination of the mobile management node MME.

The mobile communication system of the embodiment may be an LTE-Release 10 system network that supports an MTC function or an LTE-Release 8/9/10 system network that does not support the MTC function.

The mobile station UE of the embodiment is configured to operate as an MTC terminal. As illustrated in FIG. 2, the mobile station UE includes a transmission unit 11, a reception unit 12, and a control unit 13.

The transmission unit 11 is configured to transmit an AS (Access Stratum) message or an RRC (Radio Resource Control) message to the radio base station eNB, and to transmit an NAS (Non Access Stratum) message to the mobile management node MME.

The reception unit 12 is configured to receive the AS message from the radio base station eNB and to receive the NAS message from the mobile management node MME.

The control unit 13 is configured to determine whether a predetermined network is compatible with the MTC function based on signaling from the predetermined network.

For example, the control unit 13 may be configured to recognize that the predetermined network is incompatible with the MTC function based on "Attach Accept" that does not include "MTC function compatible Indication" indicating MTC function-compatible.

At this point, the control unit 13 is configured not to transmit "RRC Connection Request" to the predetermined network through the transmission unit 11 when recognizing that the predetermined network is incompatible with the MTC function.

The control unit 13 is also configured to perform an attach process and a detach process through the transmission unit 11 and the reception unit 12.

At this point, the control unit 13 is configured to be able to perform the normal attach process as the attach process in order to perform a normal call and an emergency call.

In the case that the mobile station UE is a VoLTE (Voice over LTE) compatible terminal, the control unit 13 is configured to be able to perform the emergency call attach process as the attach process in order to perform only the emergency call.

For example, the control unit 13 is configured to perform the normal attach process to the predetermined network when a transition is made from a power-off state to a power-on state.

Specifically, the control unit 13 is configured to transmit "RRC Connection Setup Complete (the AS message)" including "Attach Request (the NAS message)" to the radio base station eNB through the transmission unit 11 in the attach process.

For example, in the case that the mobile station UE is the VoLTE compatible terminal, the control unit 13 is configured as follows. That is, when "Attach Accept" received in the normal attach process performed to the predetermined network does not include "MTC function compatible Indication" indicating MTC function-compatible, after the detach process is performed to the predetermined network, a standby is performed in an "acceptable cell", and the transition is made to "USIM (Universal Subscriber Identity Module) invalid (a USIM invalid state)/LSS (Limited Service State) state", namely, a state in which the normal call cannot be used until the power is turned on after the power is turned off.

In such cases, the control unit 13 may be configured to perform the emergency call attach process to the network compatible with the emergency call.

On the other hand, in the case that the mobile station UE is a VoLTE incompatible terminal, the control unit 13 is configured as follows. That is, when "Attach Accept" received in the normal attach process performed to the predetermined network does not include "MTC function compatible Indication" indicating MTC function-compatible, after the detach process is performed to the predetermined network, the standby is performed in the "acceptable cell", and the transition is made to "USIM invalid (the USIM invalid state)/LSS state", namely, the state in which the normal call cannot be used until the power is turned on after the power is turned off.

In such cases, because the control unit 13 cannot perform the emergency call attach process, the mobile station UE cannot use not only the normal call but also the emergency call. However, the mobile station UE can use the reception of an ETWS (Earthquake and Tsunami Warning System) signal.

An example of operation of the mobile communication system of the embodiment will be described below with reference to FIG. 3.

In Step S1001, the mobile station UE that operates as the MTC terminal transmits "RRC Connection Request" to the radio base station eNB.

In Step S1002, the radio base station eNB transmits "RRC Connection Setup" to the mobile station UE.

In Step S1003, the mobile station UE transmits "RRC Connection Setup Complete" including "Attach Request" for the normal attach process performed to the predetermined network to the radio base station eNB.

At this point, the mobile station UE may include the information element "Delay Tolerant Indication" in "RRC Connection Setup Complete".

In Step S1004, the radio base station eNB transmits "UL NAS Transport (an S1AP message)" including "Attach Request" to the mobile management node MME.

In the case that the MTC function is not supported in the network including the mobile management node MME and the radio base station eNB, the mobile management node MME transmits "DL NAS Transport (S1AP message)", which does not include "MTC function compatible Indication" indicating MTC function-compatible but includes "Attach Accept", to the radio base station eNB in Step S1005.

At this point, existence or non-existence of the MTC function support may be set in a unit of PLMN (Public Land Mobile Network) or another unit.

In Step S1006, the radio base station eNB transmits "DL Information Transfer (the AS message)" including "Attach Accept" to the mobile station UE.

In the case that the received "Attach Accept" does not include "MTC function compatible Indication", the mobile station UE recognizes that the mobile station UE camps on the domination of the network that does not support the MTC function in Step S1007, performs the detach process to the predetermined network in Step S1008, and performs the standby in the "acceptable cell" to make the transition to "USIM invalid state/LSS state" in Step S1009.

In the case that the mobile station UE is the VoLTE compatible terminal, the emergency call attach process is performed to the network compatible with the emergency call, whereby the emergency call can be performed although the normal call cannot be performed.

Then, the mobile station UE does not transmit the AS message or the NAS message (for example, "Service Request") to the radio base station eNB and the mobile management node MME until the transition is made to the power-on state after the transition is made to the power-off state.

According to the mobile communication system of the first embodiment of the present invention, the transmission of "Service Request" from the MTC terminal can be prevented with no impact on a network function.

(First Modification)

A mobile communication system according to a first modification of the present invention will be described below with reference to FIG. 4 by focusing on a difference with the mobile communication system according to the first embodiment.

An example of operation of the mobile communication system of the first modification will be described below with reference to FIG. 4.

Figure 4:
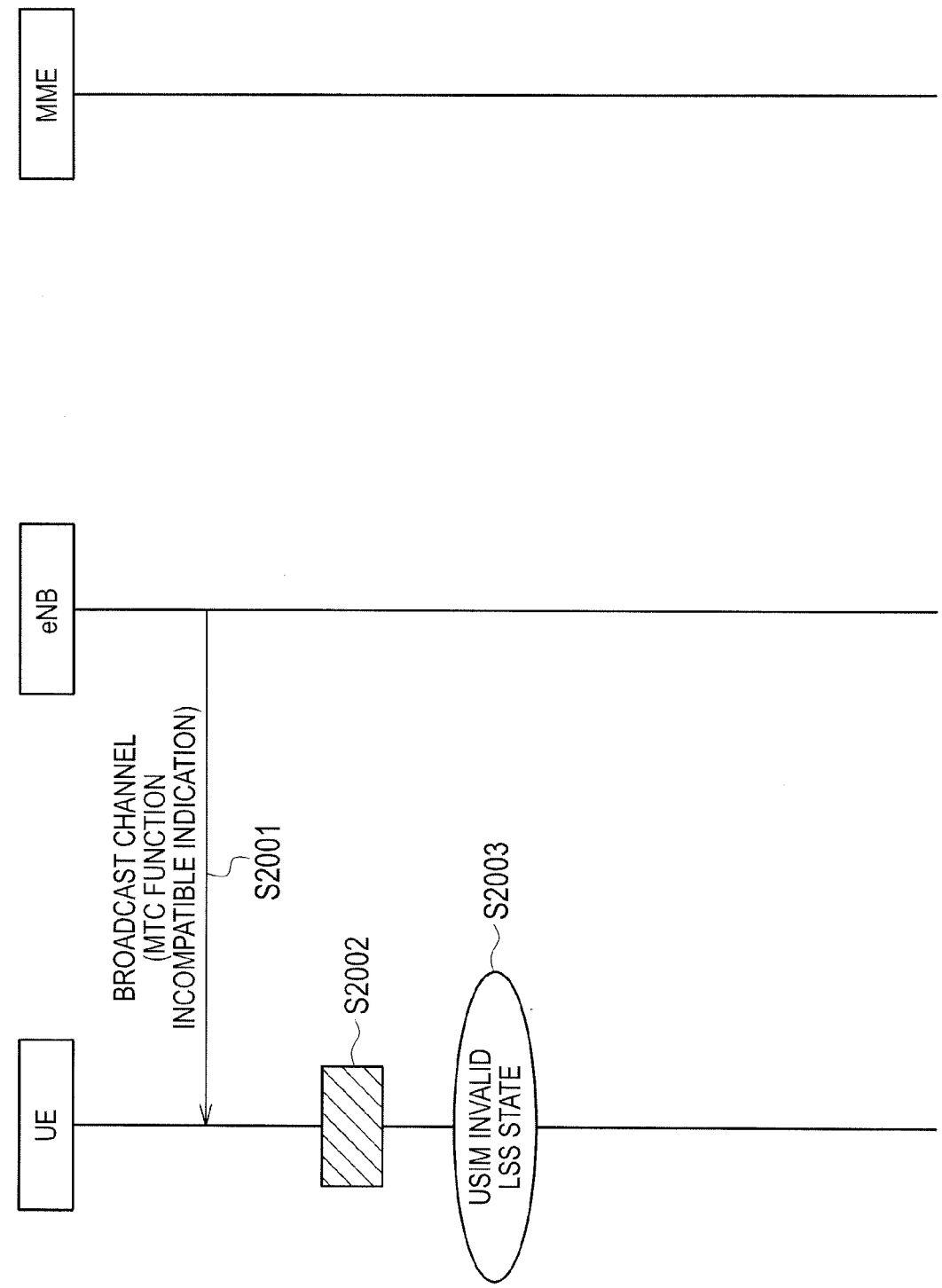
FIG. 4 is a sequence diagram illustrating operation of a mobile communication system according to a first modification of the present invention.

As illustrated in FIG. 4, in the case that the MTC function is not supported in the network including the radio base station eNB, the radio base station eNB transmits a broadcast signal including "MTC function incompatible Indication" indicating MTC function-incompatible through a broadcast channel in the cell under the domination of the radio base station eNB in Step S2001.

In the case that the broadcast signal includes "MTC function incompatible Indication", the mobile station UE that operates as the MTC terminal recognizes that the mobile station UE camps on the domination of the network that does not support the MTC function in Step S2002, and the mobile station UE performs the standby in the "acceptable cell" without performing the normal attach process to the predetermined network, and makes the transition to "USIM invalid state/LSS state" in Step S2003.

In the case that the mobile station UE is the VoLTE compatible terminal, the emergency call attach process can be performed to the network compatible with the emergency call.

Then, the mobile station UE does not transmit the AS message or the NAS message (for example, "Attach Request") to the radio base station eNB and the mobile management node MME until the transition is made to the power-on state after the transition is made to the power-off state.

On the other hand, in the case that the MTC function is supported in the network including the radio base station eNB, the radio base station eNB transmits the broadcast signal that does not include "MTC function incompatible Indication" indicating MTC function-incompatible through the broadcast channel in the cell under the domination of the radio base station eNB in Step S2001.

In the case that the broadcast signal does not include "MTC function incompatible Indication", the mobile station UE that operates as the MTC terminal recognizes that the mobile station UE camps on the domination of the network supporting the MTC function, and the mobile station UE transmits "Attach Request" to the mobile management node MME after transmitting "RRC Connection Request" to the radio base station eNB.

In the case that the MTC function is not supported in the network including the radio base station eNB, the radio base station eNB may transmit the broadcast signal that does not include "MTC function compatible Indication" indicating MTC function-compatible through the broadcast channel in the cell under the domination of the radio base station eNB in Step S2001.

In such cases, because the broadcast signal does not include "MTC function compatible Indication", the mobile station UE that operates as the MTC terminal recognizes that the mobile station UE camps on the domination of the network that does not support the MTC function, and the mobile station UE performs the standby in the "acceptable cell" without performing the normal attach process to the predetermined network, and makes the transition to "USIM invalid state/LSS state" in Step S2003.

In the case that the mobile station UE is the VoLTE compatible terminal, the emergency call attach process can be performed to the network compatible with the emergency call.

In the case that the MTC function is supported in the network including the radio base station eNB, the radio base station eNB may transmit the broadcast signal including "MTC function compatible Indication" indicating MTC function-compatible through the broadcast channel in the cell under the domination of the radio base station eNB in Step S2001.

In such cases, because the broadcast signal includes "MTC function compatible Indication", the mobile station UE that operates as the MTC terminal recognizes that the mobile station UE camps on the domination of the network supporting the MTC function, and the mobile station UE may transmit "Attach Request" to the mobile management node MME after transmitting "RRC Connection Request" to the radio base station eNB.

According to the mobile communication system of the first embodiment of the present invention, not only the transmission of "Service Request" from the MTC terminal but also the transmission of "Attach Request" from the MTC terminal can be prevented.

The features of the embodiment may be expressed as follows.

According to a first feature of the embodiment, the mobile station UE includes the control unit 13 that is configured not to transmit "RRC Connection Request (the connection request signal)" to a predetermined network when recognizing that the predetermined network is incompatible with the MTC function (the predetermined function) based on signaling from the predetermined network.

In the first feature of the embodiment, the control unit 13 may be configured to recognize that the predetermined network is incompatible with the MTC function based on "Attach Accept (the attach response signal)" that does not include "MTC function compatible Indication (the instruction information)" indicating MTC function-compatible.

In the first feature of the embodiment, the control unit 13 may be configured to recognize that the predetermined network is incompatible with the MTC function based on the broadcast signal that is transmitted in the cell of the predetermined network.

In the first feature of the embodiment, the control unit 13 may be configured to perform the standby in the "acceptable cell" after performing the detach process to the predetermined network and to make the transition to "USIM invalid (USIM invalid state)/LSS state" until the power is turned on after the power is turned off, when "Attach Accept" does not include "MTC function compatible Indication".

In the first feature of the embodiment, the control unit 13 may be configured to perform the standby in the "acceptable cell" and to make the transition to "USIM invalid (USIM invalid state)/LSS state" until the power is turned on after the power is turned off, when the broadcast signal does not include "MTC function compatible Indication (first instruction information)" indicating MTC function-compatible, or when the broadcast signal includes "MTC function incompatible Indication (second instruction information)" indicating MTC function-incompatible.

The operation of the mobile management node MME, the radio base station eNB, the mobile station UE, or the like may be performed by hardware, a software module executed by a processor, or a combination of thereof.

The software module may be provided in any storage medium such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, and a CD-ROM.

The storage medium is connected to the processor such that the processor can write and read information in and from the storage medium. The storage medium may be integrated in the processor. The storage medium and the processor may be provided in an ASIC. The ASIC may be provided in the mobile management node MME, the radio base station eNB, the mobile station UE, or the like. The storage medium and the processor may be provided as a discrete component in the mobile management node MME, the radio base station eNB, the mobile station UE, or the like.

Although the present invention is described in detail using the embodiment, it is clear for those skilled in the art that the present invention is not limited to the embodiment. Various corrections and changes can be made without departing from the scope of the present invention. Accordingly, the description is aimed only at the illustration, and the description has no restrictive meaning to the present invention.

REFERENCE SIGNS LIST

MME mobile management node
eNB radio base station
UE mobile station
11 transmission unit
12 reception unit
13 control unit

The invention claimed is:

1. A mobile station comprising a control unit that is configured not to transmit a connection request signal to a predetermined network when recognizing that the predetermined network is incompatible with a predetermined function based on signaling from the predetermined network,
   wherein the control unit is configured to recognize that the predetermined network is incompatible with the predetermined function based on an attach response signal that does not include instruction information indicating the predetermined function-compatible, wherein the control unit is configured to determine whether or not the attach response signal includes the instruction information, and perform standby in an acceptable cell after performing a detach process to the predetermined network and to make a transition to a USIM invalid state until a power is turned on after the power is turned off, when the attach response signal does not include the instruction information.

2. A mobile station comprising a control unit that is configured not to transmit a connection request signal to a predetermined network when recognizing that the predetermined network is incompatible with a predetermined function based on signaling from the predetermined network, wherein the control unit is configured to recognize that the predetermined network is incompatible with the predetermined function based on a broadcast signal is transmitted in a cell of the predetermined network, wherein the control unit is configured to determine whether or not the broadcast signal includes first instruction information indicating the predetermined function-compatible or determine whether or not the broadcast signal includes second instruction information indicating the predetermined function-incompatible, and perform standby in an acceptable cell and to make a transition to a USIM invalid state until a power is turned on after the power is turned off, when the broadcast signal does not include the first instruction information or when the broadcast signal includes the second instruction information.

* * * * *